J. S. FOWLER.
Corn-Planter.
No. 29,578.
Patented Aug. 14, 1860.
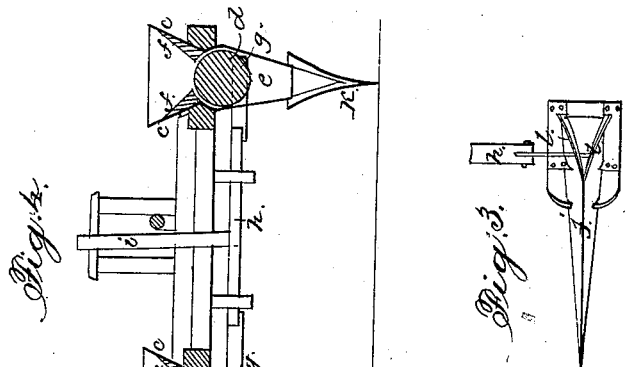
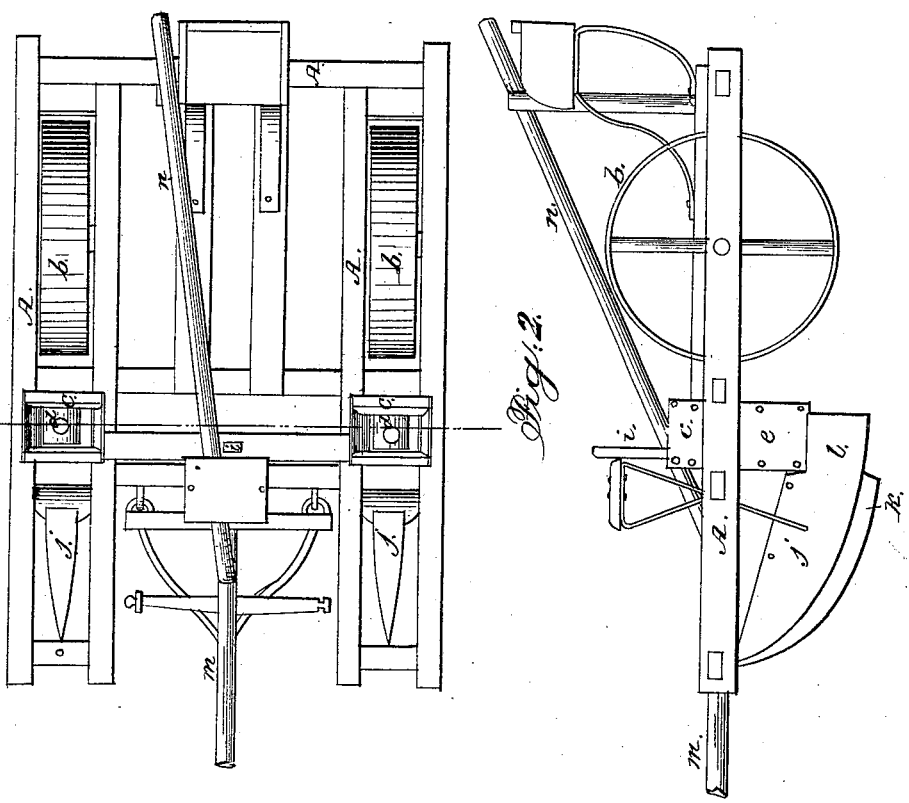

UNITED STATES PATENT OFFICE.

JAMES S. FOWLER, OF PEORIA, ILLINOIS.

IMPROVEMENT IN CORN-PLANTERS.

Specification forming part of Letters Patent No. 29,578, dated August 14, 1860.

*To all whom it may concern:*

Be it known that I, JAMES S. FOWLER, of the city and county of Peoria, State of Illinois, have invented certain new and useful Improvements in Corn-Planters, of which the following is a full, clear, and exact description, reference being had to the accompanying drawings, forming part of this specification, in which—

Figure 1 represents a plan of a corn-planter embracing my improvements. Fig. 2 represents a side elevation of the same. Fig. 3 represents a plan of the under side of the plow for opening and closing the drills. Fig. 4 represents a transverse section on the line $x\, x$ of Fig. 1, in order to show the arrangement of the seeding-cylinders and the mechanism by which they are operated.

The object of my invention is to make a clean, regular, and open furrow, and to scatter the seed transversely in the furrow instead of discharging it in the center; and my invention for effecting this object consists in arranging the seeding-cylinder with its axis parallel to the line of motion of the machine, and giving to it an alternate rocking motion, so that the grain is discharged alternately from opposite sides, in connection with a sled-runner drill-plow so constructed as to form a straight furrow with slightly inclined sides and to embrace the seeding-tube to prevent the earth from falling into the furrow until after the seed is deposited, by which means the seed is scattered in the drill transversely instead of being always thrown into the center.

By reference to the accompanying drawings, my improvements will be more fully understood.

This planter consists of a frame, $a$, of the proper form, which is supported at the rear on two wheels, $b$. In front of the wheels, and on either side of the frame, are arranged boxes $c$, to receive the seed. The seeding-cylinder $d$ is arranged with its axis in the longitudinal direction of the machine, and has its bearings in a tube, $e$, extending from the bottom of the box. Valves $f$, of vulcanized rubber, are attached to the side of the seed-box, and rest on the surface of the cylinder, serving the purpose of cut-off and striker to the measuring-cup. In the end of each cylinder is a crank-pin, $g$, which is connected by a link with a bar, $h$, traversing in guides in the frame. This bar is operated by a lever, $i$, which communicates to it a reciprocating motion and to the seeding-cylinder a rocking motion. The cups on the surface of the cylinder are so arranged that when the cylinder is turned in one direction the contents of the cup on that side are discharged, and when turned in the opposite direction the contents of the cup on the opposite side are discharged, so that the grain may be scattered on either side of the center of the drill made by the plow a distance equal to the radius of the seeding-cylinder. Attached to the front of the frame is a drill-plow, $j$, whose lower or cutting edge, R, is a thin plate of steel bent in the form of a sled-runner. The sides $l$ of the plow flare slightly as they rise from the cutting-edge, and also as they extend back from the point. Back of the cutting-edge the sides divide, and are bent outward on either side of the seed-tube, and form guides to the grain as it is discharged from the seed-box.

A driver's seat is arranged on the rear end of the machine, in order to in a measure balance the weight of the fore part, and on the front of the machine is also arranged a seat for the person operating the lever giving motion to the seeding-cylinder.

Extending from the pole or perch $m$, by which the machine is drawn, back to the driver's seat is a long lever, $n$, for the purpose of raising the plows from the ground when not in use.

The seeding-cylinder may receive motion automatically through a lever connected at one end with the bar uniting the two cylinders, and operated by means of a proper-shaped cam placed on the side of one of the wheels of the machine.

The great advantage in combining the sled-runner plow with the seeding-cylinder arranged to scatter the seed laterally is, that a straight and uniform furrow is made with clean, smooth, and nearly vertical sides, so that the seed in being scattered transversely is not caused to roll into the center of the drill.

What I claim as new, and desire to secure by Letters Patent, is—

A seeding-cylinder arranged with its axis parallel to the line of motion of the machine, and having an alternate rocking motion in opposite directions in order to scatter the seed laterally, in combination with a sled-runner drill-plow constructed and arranged substantially as described, for the purpose as set forth.

In testimony whereof I have subscribed my name.

JAMES S. FOWLER.

Witnesses:
 DAVID M'CULLOCH,
 BERNARD BAILEY.